(12) United States Patent
Brucker et al.

(10) Patent No.: US 8,473,505 B2
(45) Date of Patent: Jun. 25, 2013

(54) SYSTEM AND METHOD FOR PROVIDING DELEGATION ASSISTANCE

(75) Inventors: Achim Brucker, Karlsruhe (DE); Helmut Petritsch, Karlsruhe (DE)

(73) Assignee: SAP AG, Walldorf (DE)

( * ) Notice: Subject to any disclaimer, the term of this patent is extended or adjusted under 35 U.S.C. 154(b) by 301 days.

(21) Appl. No.: 12/494,763

(22) Filed: Jun. 30, 2009

(65) Prior Publication Data
US 2010/0332504 A1     Dec. 30, 2010

(51) Int. Cl.
*G06F 17/00*     (2006.01)
(52) U.S. Cl.
USPC ............ 707/759; 707/737; 707/758; 713/182
(58) Field of Classification Search
USPC ................... 707/737, 738, 758, 759; 713/182
See application file for complete search history.

(56) References Cited

U.S. PATENT DOCUMENTS

| | | | |
|---|---|---|---|
| 2005/0091098 A1* | 4/2005 | Brodersen et al. | 705/8 |
| 2006/0156020 A1* | 7/2006 | Minium et al. | 713/182 |
| 2006/0235850 A1* | 10/2006 | Hazelwood et al. | 707/9 |
| 2009/0119601 A1* | 5/2009 | Adachi et al. | 715/753 |

* cited by examiner

*Primary Examiner* — Belix M Ortiz Ditren
(74) *Attorney, Agent, or Firm* — Schwegman Lundberg & Woessner, P.A.

(57) ABSTRACT

The embodiments described herein provide various techniques for providing delegation assistance. Upon a request for delegation assistance, data from information sources are retrieved. Relationships are automatically identified relative to a requesting user based on the data from the information sources. The relationships are automatically ranked, and results of the ranking are provided to the requesting user. The user may then trigger delegation resolution based in part on the results of the ranking.

24 Claims, 7 Drawing Sheets

SYSTEM AND METHOD FOR PROVIDING DELEGATION ASSISTANCE

FIELD

The present disclosure relates generally to performing tasks, and more particularly, in an exemplary embodiment, relates to providing delegation assistance in a networked system.

BACKGROUND

Conventionally, networked systems, such as information technology systems, utilize access control mechanisms based on policies. Enforcement of these policies may prevent users of the networked system from completing tasks. For example, the users may not have access rights to documents or information to complete a task.

BRIEF DESCRIPTION OF DRAWINGS

Various ones of the appended drawings merely illustrate exemplary embodiments and cannot be considered as limiting its scope.

DESCRIPTION OF EXAMPLE EMBODIMENTS

Figure 1:
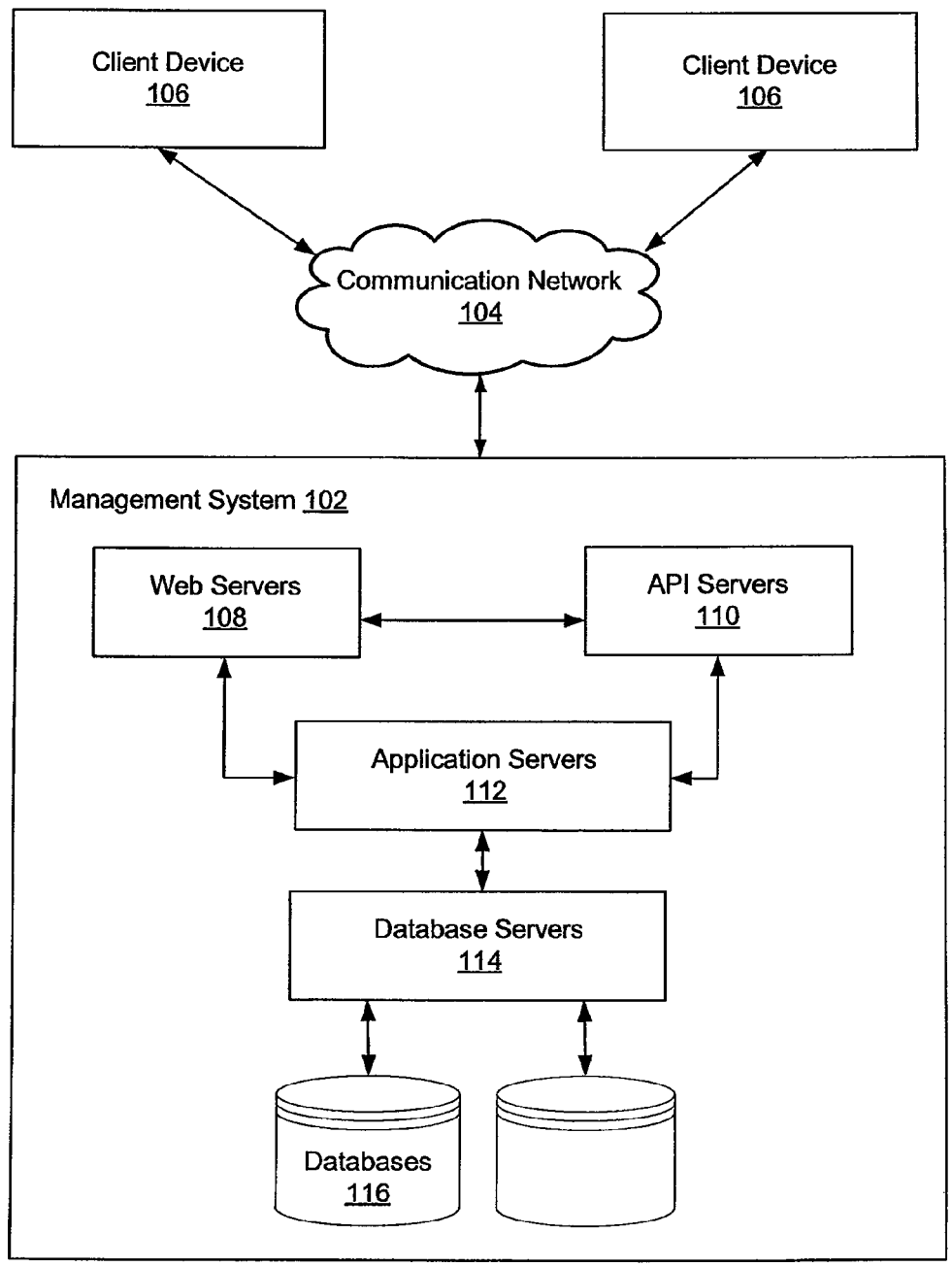
FIG. 1 is a block diagram illustrating an exemplary embodiment of a network architecture of a system used to provide delegation assistance.

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Each of a variety of exemplary embodiments is discussed in detail, below.

Exemplary embodiments comprise systems and methods for providing delegation assistance. In exemplary embodiments, if a user is denied access to information or denied authorization to perform a task, delegation assistance is triggered. In an alternative embodiment, a user may manually trigger the delegation assistance. Delegation assistance aids a user in finding, for example, an individual (e.g., mentor) who is permitted to execute a specific task, an individual who is permitted to delegate a specific task, or an individual with an ability to extend access rights to the user. For users not permitted to access a resource, delegation assistance can provide feedback suggesting mentors who can either execute a required task or can delegate required access rights to the user. Thus, these mentors, for example, can help in resolving potential dead-lock or stagnation caused by enforced access control policies. Additionally, delegation assistance can find an individual who has required access rights to whom a task can be delegated without having to delegate access rights (e.g., find an individual to fill in during vacation).

In exemplary embodiments, delegation assistance can support the user in determining who of the user's direct contacts are permitted to act as mentor and furthermore, which of these individuals are actually reachable (e.g., logged into the system). Another situation where delegation assistance is useful is where there are only a few possible mentors who are not directly related to the user, thus requiring an intermediary. The user may have problems manually determining who of his indirect contacts may have sufficient permissions to be a mentor and who may act as an intermediary. Exemplary embodiments provide a result comprising one or more optimal sets of individuals or mentors organized in a manner that allows the user to determine one or more "closest" individuals to help resolve a situation in order to fulfill a task. A closeness metric may be based on, for example, organizational hierarchy, office location, current location, or security policies (e.g., role hierarchy). Further closeness factors include projects (e.g., working on the same project) and acquaintances (e.g., know the user). Closeness does not necessarily indicate a physical closeness, but may refer to, for example, working on the same projects, having the same manager, and knowing the same people who can refer you (e.g., an intermediary). In exemplary embodiments, the resulting optimal sets are determined using various information sources that are combined based on user configurable distance-functions for finding the optimal set(s).

With reference to FIG. 1, an exemplary embodiment of a high-level network architecture 100 for providing delegation assistance is shown. The network architecture 100 may be a client-server architecture whereby a management system 102 provides server-side functionality via a communication network 104 to one or more client devices 106. The communication network 104 is a collection of interconnected processing systems that communicate utilizing wired or wireless mediums. Examples of communication networks, such as the communication network 106, include Local Area Networks (LANs) or Wide-Area Networks (WANs) (e.g., the Internet). In one embodiment, the network architecture 100 is contained within an enterprise, business, or organization.

The client device 106 is associated with a user. The user may perform tasks or otherwise communicate with other individuals within and outside of an organization using the client device 106. The client device 106 may comprise a desktop computer, laptop, personal digital assistant (PDA), mobile device, or any other computing device that can function with the communication network 104 to allow the user to perform tasks or communicate.

The management system 102 provides an enterprise application platform comprising a plurality of servers including web servers 108, application program interface (API) servers 110, application servers 112, and database servers 114. The web servers 108 and API servers 110 are coupled to, and provide web and programmatic interfaces respectively to, the application servers 112. The application servers 112 also host applications. The application servers 112, in turn, are coupled to database servers 114 that facilitate access to one or more databases 116.

In exemplary embodiments, information sources used for delegation assistance may be accessed by the management system 102. These information sources are not shown in FIG. 1, but may includes anything that can deliver structured information (e.g., social network platform). Examples of information that can be used in delegation assistance include, but are not limited to, role hierarchies, security labels, organizational structures, management hierarchies, process models, office locations, availability or individuals, and physical locations. Data from the information sources may include, for example, address books, security policies within the organization, where individuals work, and what projects the individuals work on.

Each of the servers 108, 110, 112, and 114 may host cross-functional services or applications which provide services to users and processes that utilize the management system 102. For example, the cross-functional services may provide portal services (e.g., web services), database services, and connectivity to applications in the application servers 112 for users that operate on the client devices 106. Additionally, the cross-functional services provide an environment for delivering enhancements to existing applications and for integrating third party and legacy applications with existing cross-functional services and applications.

While the exemplary architecture 100 of FIG. 1 employs a client-server architecture, a skilled artisan will recognize that the present disclosure is not limited to such an architecture. The exemplary architecture 100 can equally well find application in, for example, a distributed or peer-to-peer architecture system. Additionally, alternative embodiments may comprise more or less components or have the components of the network architecture 100 arranged in a different configuration.

Figure 2:
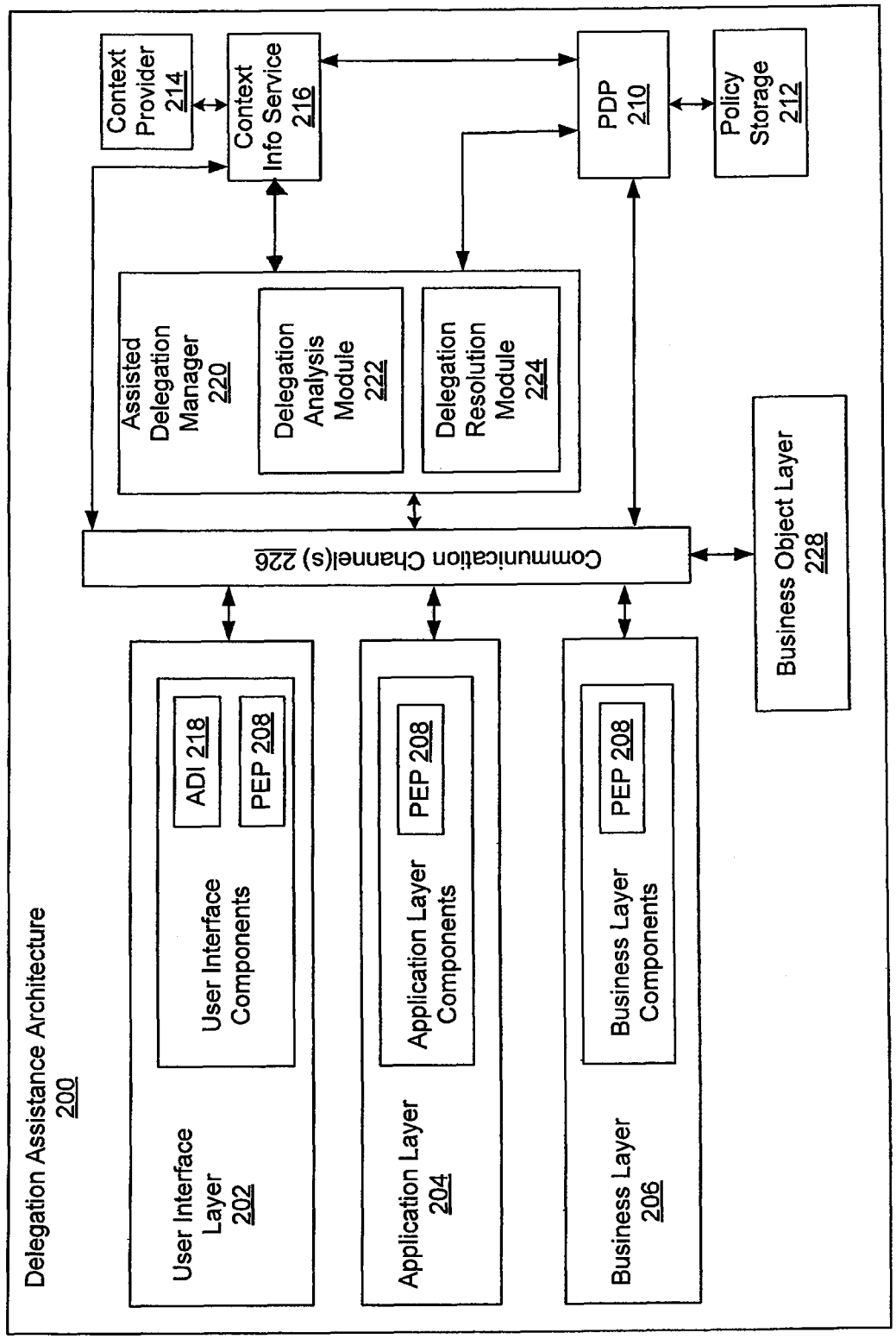
FIG. 2 is a block diagram illustrating an exemplary embodiment of a delegation assistance architecture.

Referring now to FIG. 2, a block diagram illustrating an exemplary embodiment of a delegation assistance architecture 200 is shown. The delegation assistant architecture 200 provides delegation assistance when a user lacks access permission based on access control policies to perform a task or upon request by the user. A result of the delegation assistance is one or more ordered sets or lists of individuals (also referred to as mentors). One ordered set may contain individuals that can access a requested resource which is denied to the user. Another ordered set may contain individuals that can grant access to the resource (e.g., extend access rights to the user). The sets are ordered with respect to one or more weighted functions as will be discussed in more detail below. By providing delegation assistance, access is eventually granted to the user in a controlled, automated manner that insures that a task may be completed.

The delegation assistance architecture 200 comprises a layer application containing, for example, a user interface layer 202, an application layer 204, and a business layer 206. Each of these layers includes a policy enforcement point (PEP) 208 which enforces decisions made by a policy decision point (PDP) 210. In one embodiment, the decision may be based on policies in a policy storage 212. The policy decision point 210 is responsible for evaluating access decision requests and returning an access decision response. The access decision response comprises a decision on whether access is granted or denied. In some embodiments, other access decision responses may be obtained. For example, an indeterminate or not applicable access decision response may be returned. In these cases, delegation assistance can be triggered.

The policy decision point 210 also automatically checks a list of individuals to ensure that the individuals actually have access to the requested resources, even if dynamic information flow constraints (e.g., separation of duty, binding of duty) need to be considered. This ensures that there is no need to constrain a type of access control system used (e.g., RBAC, Bell-LaPadula).

The layered application may also serve as, or be coupled to, one or more context providers 214 for providing context information. The context providers 214 deliver via a context information service 216 context information used for both access control evaluations and delegation assistance. In exemplary embodiments, the policy decision point 210 has links to the context information services 216 for the context providers 214 where the information from the different information sources are collected.

The user interface layer 202 further includes an assisted delegation interface (ADI) 218. The assisted delegation interface 218 provides a visible interface to access the functionalities of an assisted delegation manager 220. In some embodiments, the assisted delegation interface 218 allows the user to trigger a search for mentors. It should be noted that in some embodiments, the delegation assistance may be automatically triggered upon an access denial decision response. Results of the delegation assistance (e.g., set of mentors) are then displayed by the assisted delegation interface 218. The assisted delegation interface 218 may further assist in triggering subsequent actions to resolve the situation. For example, the assisted delegation interface 218 may trigger generation of support tickets or sub-tasks that can be delegated based on the results.

Delegation assistance is performed by the assisted delegation manager 220. The assisted delegation manager 220 determines an ordered set of mentors that can aid a user, as well as assisting the user in initiating actions to resolve the situation. In exemplary embodiments, the assisted delegation manager 220 comprises a delegation analysis module 222 and a delegation resolution module 224.

The delegation analysis module 222 processes a search request received from the assisted delegation interface 218 to obtain delegation assistance results. The search request may include information associated with a denied request (e.g., to what resource was access denied the user) and optional user preferences. The results can include an ordered set of mentors who can access the requested resource or a set of mentors who can extend the user access rights for the requested resource whereby the individuals or mentors in the ordered set are arranged in closeness to the user. Delegation assistance analysis will be discussed in more detail in connection with FIG. 6.

In reference to FIG. 2, The delegation resolution module 224 performs subsequent actions to assist the user in resolving the situation based on the results of the delegation assistance analysis. For example, the delegation resolution module 224 may generate tickets for a support ticket system or delegate a sub-task to another individual (e.g., mentor).

In an example using the delegation assistance architecture 200, a user triggers the delegation assistance process to search for individuals to delegate a task to or to get assistance in solving a problem (e.g., extending the user's access rights). For instance, the user may be denied access at one of the permission enforcement points 208. Information (e.g., data associated with a denial) is forwarded to the assisted delegation manager 220.

The assisted delegation manager 220 obtains data from all the different information sources (e.g., information sources 118). In one embodiment, the policy decision point 210 has links to the different context information services 216 for context providers 214 where all the data from the different information sources are collected. The data is returned to the assisted delegation manager 220 so that the delegation analysis module 222 may compute an optimal set or list of individuals that can help resolve the situation. Additionally, the assisted delegation manager 220 may also directly access the context information services 216 via a communication channel 226, thus bypassing the policy decision point 210. The optimal set is forwarded back to the user interface and presented to the user. Using the returned optimal set, the user may contact an individual, delegate a task, send a message, request extension of access rights, or any other action that will resolve the situation. These actions may be triggered or performed by the assisted delegation interface 218.

The various components of the delegation assistance architecture 200 are coupled via a communication channel 226. The communication channel 226 allows the layered applications (e.g., the user interface layer 202, the application layer 204, and the business layer 206) and subcomponent (e.g., a business object layer 228) to query the assisted delegation manager 220 and the policy decision point 210 and to allow communication from the content information services 216 to the layered applications. Therefore, the assisted delegation manager 220 and the policy decision point 210 can send requests to the layered applications via the context information services 216. The business object layer 228 comprises standard databases and business components not essential to the operation of delegation assistance and thus is not discussed further.

Figure 3:
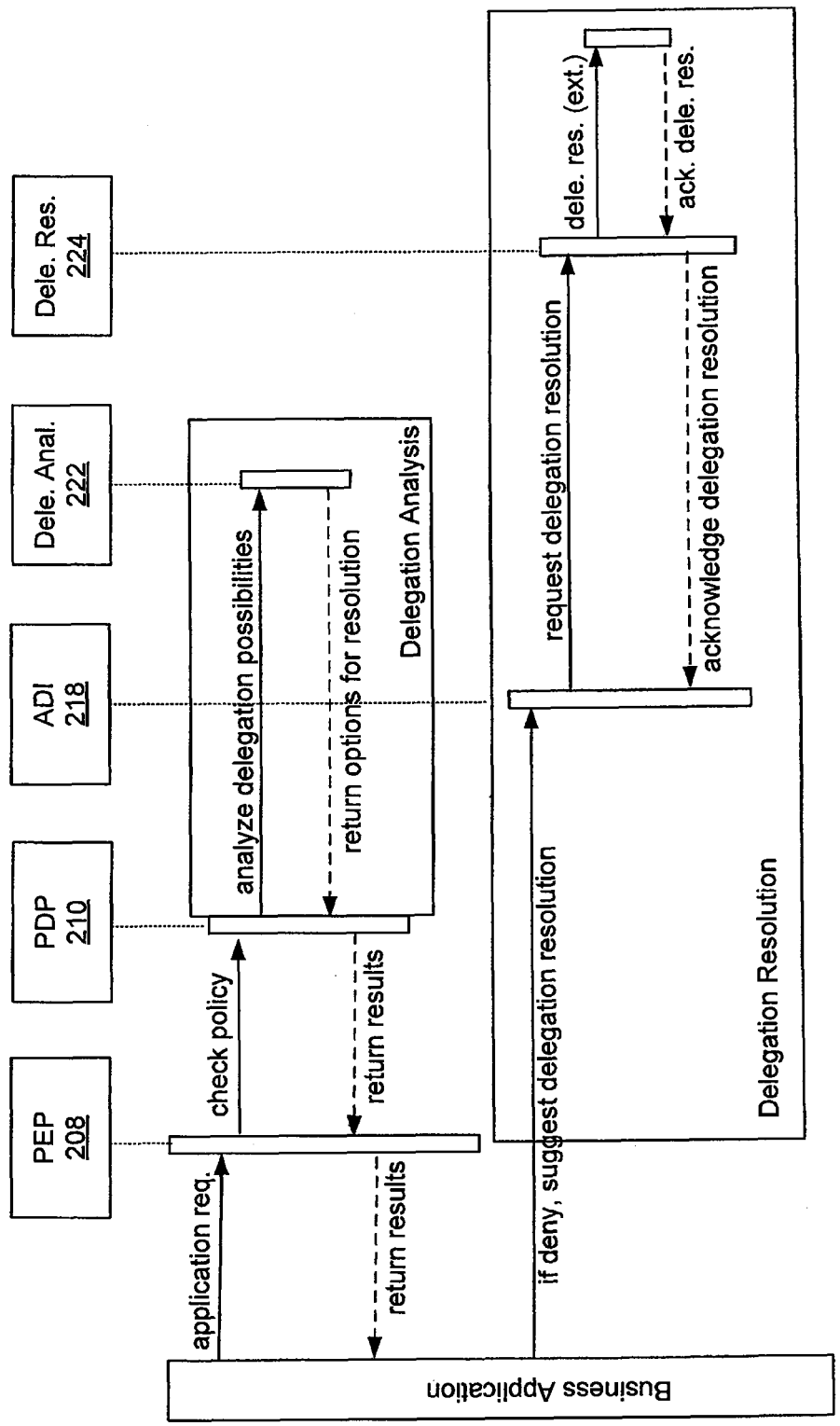
FIG. 3 is a diagram illustrating flow of communication in the delegation assistance architecture.

Referring now to FIG. 3, a detailed diagram illustrating an exemplary flow of communication (e.g., system trace) in the delegation assistance architecture is shown. The exemplary flow is triggered based on an access right deny. In the exemplary flow, one or more business applications, during runtime, requires evaluation of an access request. The policy enforcement point 208 (e.g., within the application) generates an access decision request. The access decision request is a policy check that is sent to the policy decision point 210. In the present example, the result of the policy check is an access denied or not permitted, thus triggering delegation assistance and providing the corresponding information to the user automatically. In an alternative embodiment, the trigger for delegation assistance is sent by the assisted delegation interface 218 residing on a client-side based on a manual request by the user.

The policy decision point 210 sends a request for analysis of delegation possibilities to the delegation analysis module 222. This request comprises information (e.g., subject matter, resource, action) that is needed to evaluate the policy. Based on the request and data obtained from the information sources (e.g., role hierarchy, office locations), the delegation analysis module 222 generates one or more ordered sets of individuals or mentors. Options including the optimal sets are returned to the policy decision point 210. The options along with the policy evaluation result (e.g., access denied) are then returned to the policy enforcement point 208. Subsequently, the policy enforcement point 208 enforces the policy (e.g., access denied), but also supplies delegation analysis results to the business application.

In order to resolve the situation, delegation resolution may then be performed. In one embodiment, the business application forwards the results of the delegation analysis to the assisted delegation interface 218. The assisted delegation interface 218 displays possible options or resolution strategies to the user. For example, the resolution strategy indicates the best three mentors than can assist and their contact information.

The user may then select one of the strategies to implement. Subsequently, a request for delegation resolution is sent to the delegation resolution module 224. In the present example, the situation is resolved using an external system (e.g., requesting additional access rights for the user). Thus, the delegation resolution module 224 will perform actions to trigger the external system to perform the delegation resolution (e.g., generating a support-ticket requesting additional access rights). The external system will acknowledge the delegation resolution request (e.g., the support-ticket) and an acknowledgement is returned to the assisted delegation interface 218 for display to the user.

It should be noted that the communication flow of FIG. 3 is exemplary and alternative embodiments are contemplated. For example, the delegation resolution may not involve an external system. In another example, the delegation analysis and resolution may be triggered by the user exclusive of an access denial. For instance, the user is taking a vacation and wants to delegate tasks or sub-tasks to other individuals in anticipation of the vacation.

Figure 4C:
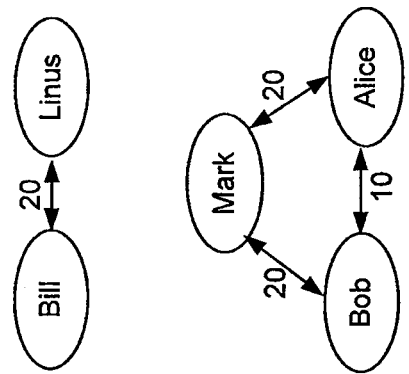
FIG. 4a-FIG. 4c are representations of distance functions.
Figure 4B:
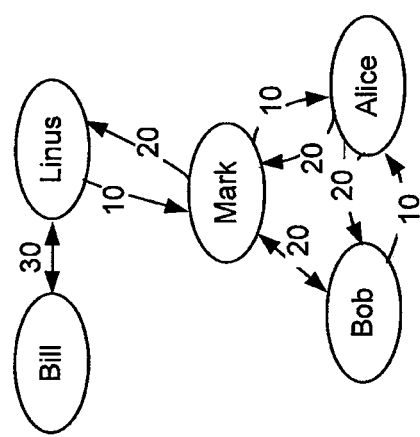
Figure 4A:
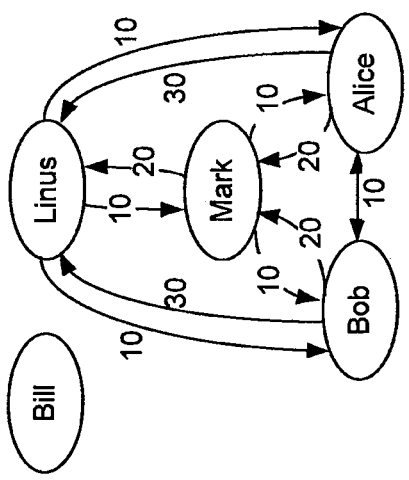

FIG. 4a-FIG. 4c illustrate examples of how weighted functions may be utilized in exemplary embodiments. These examples involve an organization having employees distributed over several locations. Bob and Alice work in a group which is managed by Mark. Several groups work together on a project managed by the project lead Linus. The groups are divided based on their tasks, whereas the project lead Linus is working at another location from Bob's group.

In exemplary embodiments, weighted functions for each of information source are inputs into the delegation assistance system. Thus, an assumption is made that if office location is an input, an administrator configures the delegation assistance system with correct weighted functions. For example, individuals working in the same office are the closest. Individuals on the same floor are close, but not as close as in the same office. Individuals in different countries are considered not close. A metric measurement function (e.g., weighted function) for these relationships are developed for every information source, and can be represented abstracted as graphs (e.g., graphs shown in FIG. 4a-FIG. 4c) whereby individuals are nodes of the graphs and links between the nodes are labeled with weighted functions. In the present embodiment, the weighted function is a distance function. Alternative embodiments may utilize other forms of weighted functions.

FIG. 4a illustrates a graph which can be used to represent distance functions of this exemplary organization. Individuals within a group have a distance 10 (e.g., Bob to Alice), contact to a superior is estimated with a distance 20 (e.g., Bob to Mark), and contact with a super-superior is a distance 30 (e.g., Bob to Linus). For superiors or super-superiors to group members, the distance is 10 (e.g., Mark to Bob or Linus to Bob). This distance is lower because the superior or super-superior can delegate tasks to group members more readily.

In the example, an assumption is made that roles are assigned with respect to the user's functions. Thus, Bob and Alice are both project members, while Bob is also a system administrator. Linus and Bill are project managers (e.g., a super-role of project member) of different projects. Finally, all users are assigned to one or more project specific roles. FIG. 4b illustrates a derived distance function graph based on roles. Similar roles result in a lower weight. For example, subjects having similar roles will be connected by an edge with a low weight. Thus, Alice and Mark are both members of the same project role, but as Mark is the manager (and thus, can more easily delegate work to Alice than the other way round), the edge from Mark to Alice has a lower weight than in the opposite direction. While Linus and Bill are both project leads, they are managing different projects. Thus, Linus and Bill are connected by a high valued edge (e.g., 30).

FIG. 4c illustrates location distances. Since, Bob and Alice are working in the same room, the distance is 10. Others that are working in nearby rooms are assigned a distance of 20. In the present example, edges between individuals working in different locations are not modeled. However a general rule is that individuals that are close to each other should be connected with an edge having a relatively small weight.

If Bob tries to access a resource for which individuals from his location have access, delegation assistance suggests individuals from Bob's location with preference for those from his own group, project, or room. If none of these individuals have the required permission (or is currently not available), currently reachable individuals from his location will be suggested. If no individuals are currently reachable from Bob's location, delegation assistance then suggests further individuals that are accessible with a next lowest distance function. Thus, delegation assistance first suggests or ranks reachable individuals from Bob's location and who, therefore, knows Bob as a colleague, and expands out to include less connected (e.g., higher distance function) individuals.

Assume Bob tries to access a resource for a project from a different location (e.g., none of the project members share their location with Bob and no members of Bob's team have access to the required resource). Applying delegation assistance helps in finding an individual "close" to Bob which can introduce Bob to someone having the required access rights. In the present example, Bill is the project lead of an external project and, in this example, delegation assistance will suggest Bill to Bob. Additionally, Linus will be suggested as an intermediary known to both Bob and Bill.

Combination algorithms for combining the links between the nodes may be applied to the graphs in order to derive one or more ordered sets of mentors. Any number of metric measurements or weighted functions may be combined in any number of different combinations. In one example, two graphs may be combined to calculate an average. Initially, data from all of the information sources are translated into graphs modeling the relationships between different individuals (e.g., as discussed in with respect to FIG. 4a-FIG. 4c). An information graph is a directed weighted graph $G=(V, E, \omega, \omega_m)$ where V is a set of vertices (representing the individuals), E is a set of edges (representing relationships between the individuals), and $\omega: V \rightarrow N_0$, where $\forall v \in V.0 \leq \omega(v) \leq \omega_m$, is a function assigning a weight (e.g., a numeric label) to each edge which is smaller than $\omega_m$.

Intuitively, the edge weight represents a degree of familiarity on a scale from 0 (very familiar) to $\omega_m$ (not familiar) between two individuals. Directed graphs are used for representing asymmetric relations. For example, a project lead usually has a close connection (can delegate tasks easily) to a regular project member, whereas the opposite is not necessarily true. Finally, the set of information graphs with a maximum weight $\omega_m$ is denoted with $\mathcal{G}_{\omega_m}$.

The delegation analysis module 222 merges these information graphs. For example, assume two information graphs $G_1$, $G_2 \in \mathcal{G}_{\omega_m}$ with $G_1=(V_1, E_1, \omega_1, \omega_m)$ and $G_2=(V_2, E_2, \omega_2, \omega_m)$. Conceptually, $G_1$ and $G_2$ may be merged into a new information graph $G=(V, E, \omega, \omega_m) \in \mathcal{G}_{\omega_m}$ using a three-folded algorithm.

First, the set of vertices are merged.

$$V = V_1 \Theta V_2, \text{ where } \Theta \in \{\_\cup\_, \_\cap\_, \_\setminus\_, \_\Theta\_\}.$$

Next, the set of edges are merged.

$$E = \{e \in E_1 \cup E_2 | \text{src}(e) \in V \wedge \text{dest}(e) \in V\}$$

where src(e) denotes a source vertex and dest(e) denotes a destination vertex of the edge e.

Then the edge weights are updated for all edges $e \in E$. For example, $$\begin{cases} \omega_1(e) & \text{if } e \in E \cap E_1 \setminus E_2 \\ \omega_2(e) & \text{if } e \in E \cap E_2 \setminus E_1 \\ f(\omega_1(e), \omega_2(e)) & \text{otherwise} \end{cases}$$

where $f: \{0, \ldots, \omega_m\}^2 \rightarrow \{0, \ldots, \omega_m\}$ is a user-defined function merging the weights of edges that are part of both input graphs. Thus, the exemplary algorithm is not only parameterized over the two input graphs, but also over the functions for merging edges ($\_\Theta\_$) and vertices ($f(\_,\_)$).

Different choices are available for the functions. For the vertices, join and disjoin are the most likely used methods for merging the vertices. Joining vertices (e.g., $V=V_1 \cup V_2$) guarantees a maximal set of solutions. This is especially true in situation in which one subset has only a few connections, or if the maximum degree of the graphs to be merged is small. Disjoining the vertices (e.g., $V=V_1 \cap V_2$), allows for a quick reduction of the solution set in cases where otherwise the end user will be swamped with too much information or the system needs to handle large data sets not contributing to the solution. The disjoin case can be used to remove all vertices which should be removed from the possible set of mentors (e.g., remove users which are currently not available).

With respect to the edges, the class $\mathcal{G}_{\omega_m}$ should be closed under the application of this function. For example, for a merge function $f$ and a given $\omega_m$ $$\forall \omega_1, \omega_2 \in N_0 \cdot (0 \leq \omega_1 \leq \omega_m) \wedge (0 \leq \omega_2 \leq \omega_m) \Rightarrow (0 \leq f(\omega_1, \omega_2) \leq \omega_m)$$

holds. A small edge weight represents a strong connection between the two subjects (vertices). Therefore, an intuitive (but not formal) requirement may be $$\forall \omega_1, \omega_2 \in N_0 \cdot f(\omega_1, \omega_2) \leq \omega_1 \wedge f(\omega_1, \omega_2) \leq \omega_2$$

(e.g., the merged edge weight is smaller or equal to a minimum of the two input weights). Thus, an obvious choice, satisfying both requirements, for f is a minimum function, such as:

$$f(\omega_1, \omega_2) = \begin{cases} \omega_1 & \text{if } \omega_1 \leq \omega_2 \\ \omega_2 & \text{otherwise.} \end{cases}$$

As an alternative, the function $$f(\omega_1, \omega_2) = \frac{\omega_1 \cdot (\omega_m - \omega_2)}{\omega_m}$$

which also satisfies the requirements and, moreover, guarantees for all $0 < \omega_1, \omega_2 < \omega_m$ that the weight $f(\omega_1, \omega_2)$ is strictly smaller than the minimum of both input weights. Intuitively, $\omega_2$ may be interpreted as a percentage to be subtracted from $\omega_1$. Further, a variant may be presented to influence a reduction of merged edges by a factor $c \in R (c \geq 1)$. Without loss of generality, $\omega_1 \leq \omega_2$ may be assumed, and $$f(\omega_1, \omega_2, c) = \frac{\omega_1 + \frac{\omega_1 \cdot \omega_2}{\omega_m} \cdot (c-1)}{c}$$

may be defined, where c describes a gradient used for decreasing edge weights. Moreover, this function has the following exemplary properties:

If c=1, then $f(\omega_1,\omega_2,c)=\omega_1$ holds

If $c_1 \geqq c_2$ then $f(\omega_1,\omega_1,c_1) \leqq f(\omega_1,\omega_2,c_2)$ holds.

If $f(\omega_2=\omega_m$ then $f(\omega_1,\omega_2,c)=\omega_1$ holds.

Thus, if one of the input weights is equal to $\omega_m$, the other weight remains unchanged.

The described algorithms and functions are exemplary. Alternative embodiments may utilize other algorithms or methods for combining the weighted functions. Furthermore, any number of weighted functions (e.g., graphs modeling relationships) may be combined. Alternatively, a single weighted function (e.g., one graph) may be used to determine the optimal set. For example, the weight functions associated with roles (e.g., see FIG. 4b) may be used alone to determine the optimal set.

Figure 5:
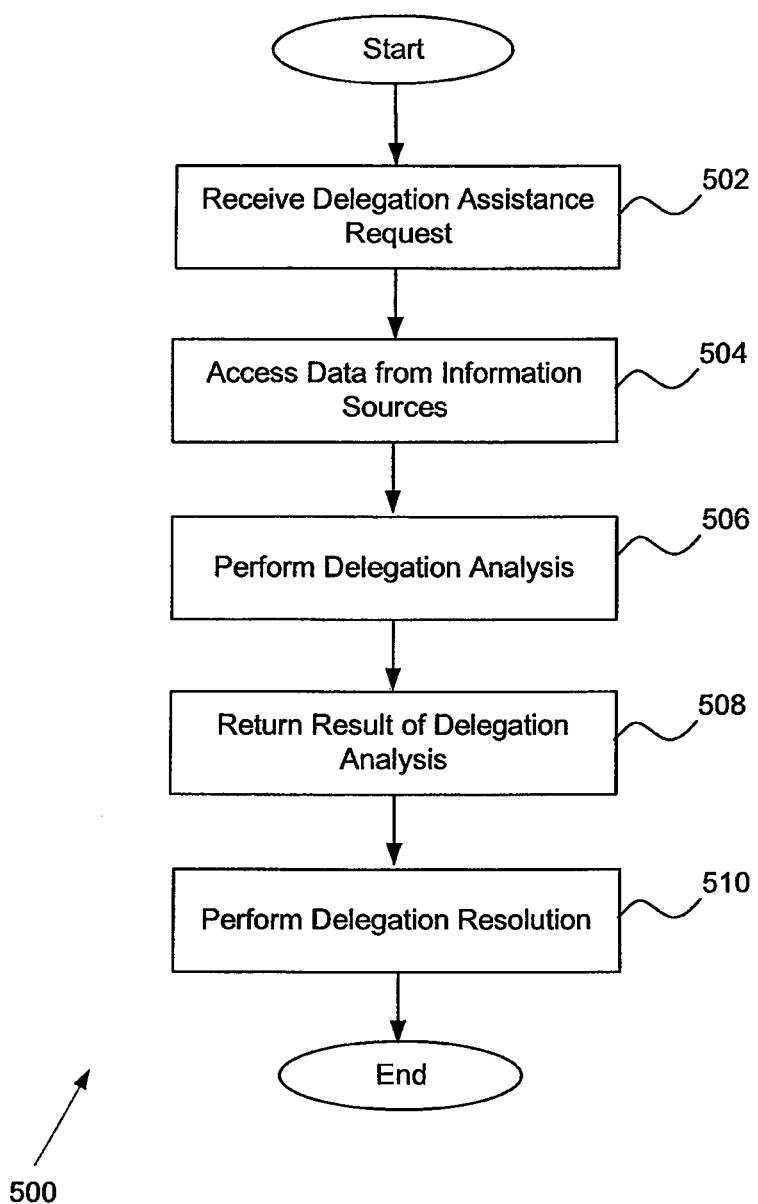
FIG. 5 is a flowchart illustrating an exemplary method to provide delegation assistance.

Referring now to FIG. 5, a flowchart illustrating an exemplary method 500 to provide delegation assistance is shown. At 502, a delegation assistance request is received. The delegation assistance request may be received in response to an access denial for information or to perform some task. In some instances, the delegation assistance request may be automatically sent upon the access denial. Alternatively, the delegation assistance request may be received from a user without an access denial (e.g., triggered by a user who wants to delegate a task while on vacation).

At 504, data from a plurality of information sources is accessed. Examples of information sources that can be used in delegation assistance include, but are not limited to, role hierarchies, security labels, organizational structures, management hierarchies, process models, office locations, availability of individuals, and physical locations. This list of information sources is not meant to be exhaustive and other information sources can be used.

At 506, delegation analysis is performed. In exemplary embodiments, the delegation analysis is performed by the delegation analysis module 222 based on the requirements of the task delegation, preferences, and data from the information sources. Delegation analysis is discussed in more detail in connection with FIG. 6.

The results of the delegation analysis are returned to the user at 508. The results, for example, comprise one or more ordered sets of individuals or mentors that the user may delegate a task or subtask to or can request extension of access rights from.

Based on the results, the user may select an option (e.g., select a mentor) and delegation resolution is performed at 510. In exemplary embodiments, the delegation resolution module 224 performs subsequent actions to assist the user in resolving the situation based on the results of the delegation assistance analysis. For example, the delegation resolution module 224 may generate tickets for a support ticket system or delegate a sub-task to another individual (e.g., mentor).

Figure 6:
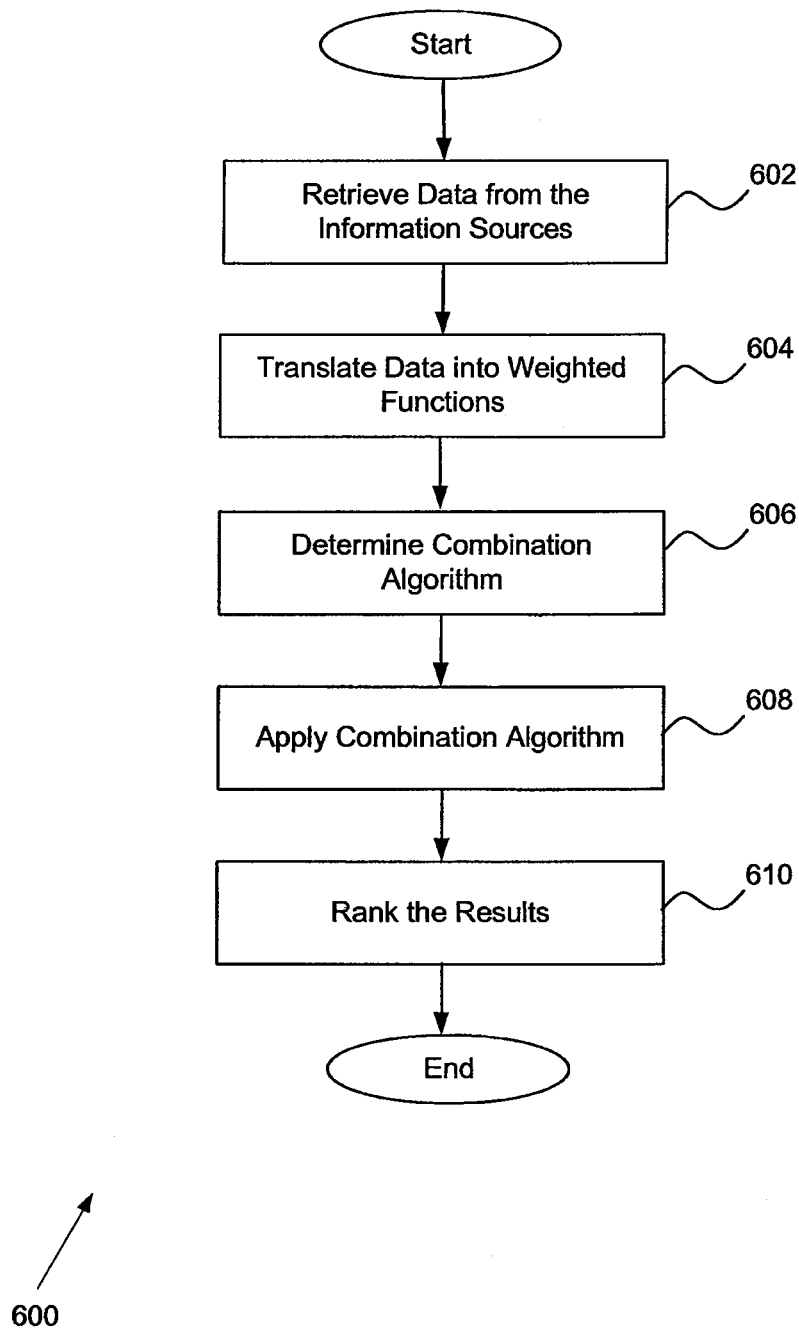
FIG. 6 is a flowchart illustrating an exemplary method to perform delegation analysis.

FIG. 6 is a flowchart illustrating an exemplary method 600 for performing delegation analysis. At 602, data is received from the plurality of information sources. The information sources may comprise any source that is available in an organization that describes relationships between people (e.g., functions, job titles, locations, projects).

As discussed above, the information source data may then be represented abstracted with weighted functions at 604. In exemplary embodiments, the data is translated into a notation or weighted functions that represent closeness relationships between systems and individuals. In one embodiment, the weighted function used is a distance relationship or distance function. Weighted functions may be defined by one or more users of the system (e.g., denied user, administrator), be based on policies established by the organization, or a combination of both (e.g., some weighted functions may be defined by the organization while other weighted functions may be user configurable). For example, individuals in the same office may be given a weight of 10, same floor given a weight of 20, same location given a weight of 30, and same country given a weight of 40. Individuals in different countries may have a weight function of infinity. Thus, a user may design the rules that define the weighted functions, but the delegation analysis module 222 assigns the weighted functions to the data from the various information sources.

One or more combination settings or algorithms are determined in 606. Combination algorithms comprise strategies on how to combine functions depending on where emphasis on a combination of different metric measurements should be placed in order to find the individuals closest to the requesting user. Closeness does not necessarily indicate a physical closeness, but may be referred to in terms of, for example, working on the same projects, having the same manager, knowing the same people who can refer you (e.g., an intermediary). For example, if not all nodes (e.g., individuals) are represented in two graphs, the combination algorithm indicates whether only nodes in both graphs should be combined or only nodes in one graph or the other combined. Thus, the combination algorithm determines how the links between nodes should be combined and how the weights should be combined. For example, the links may be averaged, summed, or subtracted. In an alternative embodiment, an over-approximation method is used, thus requiring a reduction in sets of individuals (e.g., reduction of individuals who do not have the required access rights).

At 608, the combination algorithms are applied to the weighted functions. Example combination settings or algorithms are provided above. In one embodiment, the functions may be normalized (e.g., between 1 to 100).

The results of the combination algorithms may be ranked (e.g., ordered based on weighted function) for output to the user at 610. Individuals who do not have access rights are removed (e.g., individuals that cannot act as mentors). For example, the combination algorithms may stop processing after the first three individuals who have the required access rights are identified. The results are then returned to the user. For example, a final graph may be generated starting with the requesting user in a center with linked individuals or mentors surrounding the requesting user. Links with lower number may be graphically illustrated as being closer to the requesting user. Alternatively, the result may be one or more tables that show the relationships between the requesting user and the mentors. The table may be arranged in distance ascending order (e.g., lowest distance at top of table).

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module may be a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 7:
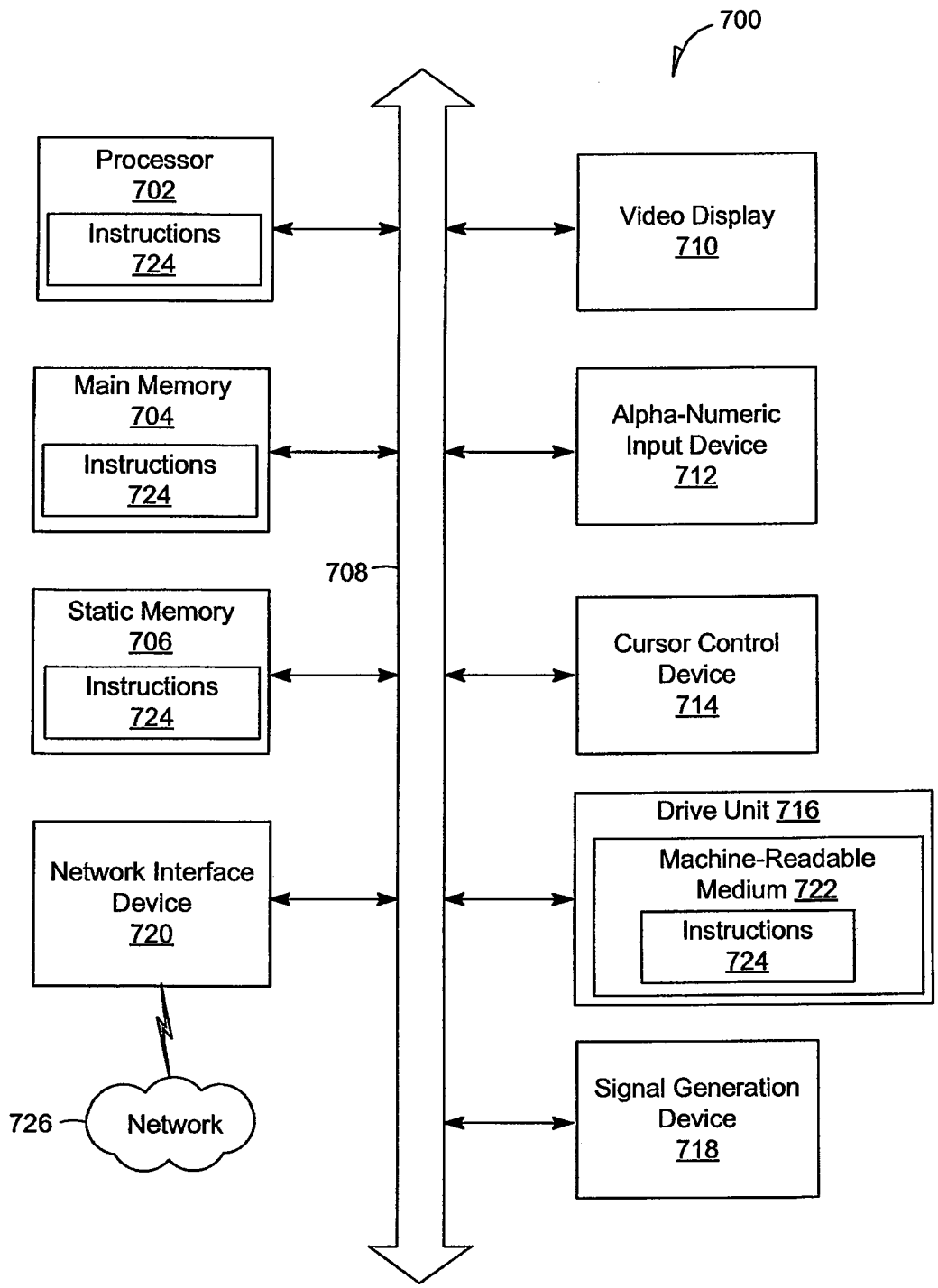
FIG. 7 is a simplified block diagram of a machine in an exemplary form of a computing system within which a set of instructions for causing the machine to perform any one or more of the methodologies discussed herein may be executed.

With reference to FIG. 7, an exemplary embodiment extends to a machine in the exemplary form of a computer system 700 within which instructions for causing the machine to perform any one or more of the methodologies discussed herein may be executed. In alternative exemplary embodiments, the machine operates as a standalone device or may be connected (e.g., network) to other machines. In a network deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In exemplary embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method to locate a delegation relationship, the method comprising:
   receiving a request associated with a requesting user to determine at least one individual having authorization to perform an action on behalf of the requesting user;
   retrieving data from a plurality of information sources based on the request;
   automatically identifying a plurality of relationships involving the requesting user and individuals identified from the plurality of information sources;
   determining, using a processor of a machine, the at least one individual having authorization to perform the action on behalf of the requesting user by ranking the plurality of relationships relative to the request user; and
   providing a result of the ranking to the requesting user.

2. The method of claim 1, wherein automatically identifying comprises translating the data from the plurality of information sources into a weighted function.

3. The method of claim 2, wherein the weighted function is a distance function.

4. The method of claim 2, wherein automatically ranking comprises determining a combination algorithm for combining the weighted function and applying the combination algorithm.

5. The method of claim 1, wherein providing the result comprises displaying a table comprising an optimal set of individuals and their relationship to the requesting user.

6. The method of claim 1. Wherein providing the result comprises displaying a graph comprising an optimal set of individuals and their relationship to the requesting user.

7. The method of claim I, further comprising triggering delegation resolution based in part on the result of the ranking.

8. The method of claim 7, wherein the delegation resolution comprises delegating a task to the at least one individual having authorization to perform the action on behalf of the requesting user.

9. The method of claim 7, wherein the delegation resolution comprises requesting the at least one individual having authorization to perform the action on behalf of the requesting user to extend access rights to the requesting user.

10. The method of claim 7, wherein the delegation resolution comprises requesting an individual identified in the result to act as an intermediary to the at least one individual having authorization to perform the action on behalf of the requesting user.

11. The method of claim 1, wherein retrieving data, automatically identifying, automatically ranking, and providing results are automatically triggered upon an access denial of the requesting user based on one or more policies.

12. The method of claim 1, further comprising checking the plurality of relationships to ensure that an individual in each of the plurality of relationships has access to a requested resource.

13. A system to locate a delegation relationship, the system comprising:
    at least one processor;
    an assisted delegation interface to receive a request associated with a requesting user to determine at least one individual having authorization to perform an action on behalf of the requesting user;
    a context provider to ret sieve data from a plurality of information sources based on the request; and
    a delegation assistance module to automatically identify a plurality of relationships involving the requesting user and individuals identified from the plurality of information sources and to determine the at least one individual having authorization to perform the action on behalf of the requesting user by ranking the pluralitv of relationships relative to the requesting user;
    the assisted delegation interface to provide a result of the ranking to the requesting user.

14. The system of claim 13 further comprising a delegation resolution module to perform delegation resolution based in part on the result of the ranking.

15. The system of claim 14, wherein the delegation resolution comprises delegating a task to the at least one individual having authorization to perform the action on behalf of the requesting user.

16. The system of claim 14, wherein the delegation resolution comprises requesting the at least one individual having authorization to perform the action on behalf of the requesting user to extend access rights to the requesting user.

17. The system of claim 14, wherein the delegation resolution comprises requesting an individual identified in the result to act as an intermediary to the at least one individual having authorization to perform the action on behalf of the requesting user.

18. The system of claim 13, further comprising a policy decision point to check a plurality of policies and to trigger retrieving data, to automatically identify, to automatically rank, and to provide results upon an access denial of the requesting user based on the plurality of policies.

19. The system of claim 13, further comprising a policy decision point to check the plurality of relationships to ensure that an individual in each of the plurality of relationships has access to a requested resource.

20. A non-transitory machine-readable storage medium in communication with at least one processor, the non-transitory machine-readable storage medium storing instructions which, when executed by the at least one processor of a machine, cause the machine to perform operations comprising:

receiving a request associated with a requesting user to determine at least one individual having authorization to perform an action on behalf of the requesting user;

retrieving data from a plurality of information sources based on the request;

automatically identifying a plurality of relationships involving the requesting user and individuals identified from the plurality of information sources;

determining, using a processor of a machine, the at least one individual having authorization to perform the action on behalf of the requesting user by ranking the plurality of relationships relative to the requesting user; and providing a result of the ranking to the requesting user.

21. The non-transitory machine-readable storage medium of claim 20, wherein automatically identifying comprises translating the data from the plurality of information sources into a weighted function.

22. The non-transitory machine-readable storage medium of claim 20, wherein the method further comprises triggering delegation resolution based in part on the result of the ranking.

23. The method of claim 1, wherein the identifying the plurality of relationships involving the requesting user and individuals identified from the plurality of information sources comprises identifying a series of one or more links from the requesting user to the at least one individual having authorization to perform the action on behalf of the requesting user.

24. The method of claim 1, wherein the ranking comprises determining an ordered set of individuals, based on closeness to the requesting user, that are authorized to perform the action on behalf of the requesting user.

* * * * *